Oct. 20, 1959 E. H. TURNER 2,909,734

NONRECIPROCAL WAVE TRANSMISSION

Filed June 3, 1955 2 Sheets-Sheet 1

INVENTOR
E. H. TURNER
BY Roy M. Porter, Jr.
ATTORNEY

INVENTOR
E. H. TURNER
BY Roy M. Porter, Jr.
ATTORNEY

United States Patent Office 2,909,734

Patented Oct. 20, 1959

2,909,734

NONRECIPROCAL WAVE TRANSMISSION

Edward H. Turner, Red Bank, N.J., assignor to Bell Telephone Laboratories, Incorporated, New York, N.Y., a corporation of New York Application June 3, 1955, Serial No. 513,065

11 Claims. (Cl. 333—24)

Figure 1:
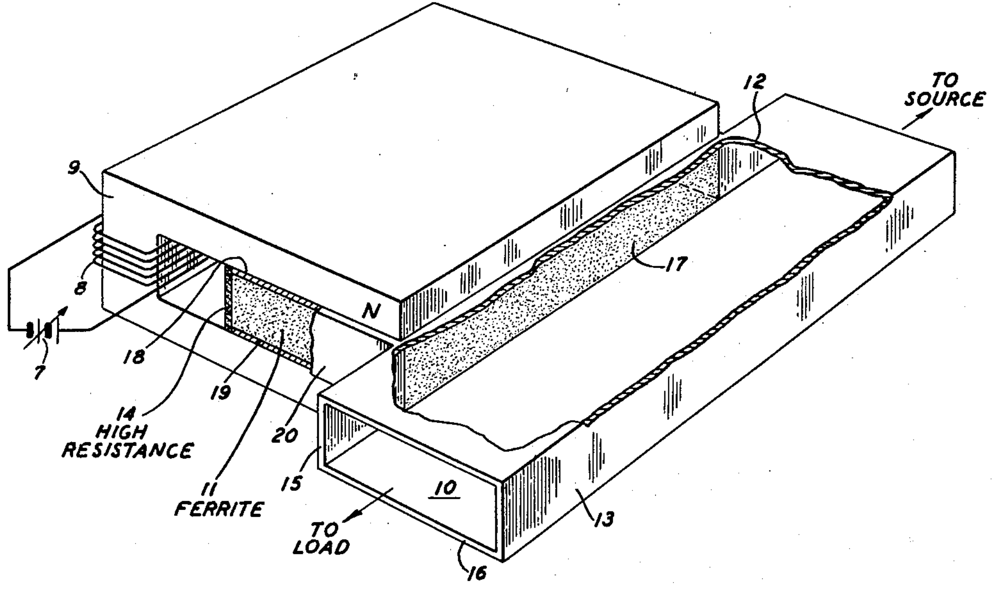

This invention relates to nonreciprocal microwave electromagnetic wave transmission devices and, more particularly, to improved one-way transmission devices employing the properties of gyromagnetic materials to directionally isolate one electromagnetic device from another.

The desirability of directional isolation in electromagnetic wave systems has been apparent for some time. For example, a very simple but particularly useful application of an isolator is found in a system in which the source or wave generation equipment, for example, a frequency modulated oscillator, is to be worked directly into a load or a transmitting antenna. As is well known, serious matching problems are encountered in such a system since any reflection or other return of energy from the antenna load has an undesirable effect upon the oscillator source. An isolator, therefore, having low loss or attenuation for waves passing from the oscillator to the antenna and high return loss or attenuation for waves passing from the antenna to the oscillator, will greatly simplify the problem.

It is an object of the present invention to introduce a substantially higher degree of attenuation to wave energy propagating in one direction along a transmission path than to wave energy propagating in the opposite direction by new and improved apparatus.

Recently the nonreciprocal properties of polarized elements of gyromagnetic material, often designated ferrites, have been utilized to provide isolators and it is recognized that the present invention provides another of several alternative structures each of which has its own outstanding features and advantages that make it primarily suitable for one application and perhaps only secondarily suitable for another application. The principal advantage of the isolator provided by the present invention stems from the fact that it inherently has a characteristic impedance that matches the system into which it is to be inserted and therefore no matching problems are involved to avoid substantial reflection producing discontinuities. A further advantage of the present invention resides in the fact that dissipation of energy takes place in the isolator structure on an outside portion thereof where generated heat may be easily controlled.

In accordance with the present invention, a conductively bounded rectangular wave guide, to be interposed in the path requiring isolation, is provided with a partially resistively bounded, transversely expanded portion forming a chamber that opens upon one of its narrow walls. The chamber is filled with gyromagnetic material which is biased by an external field to such a point that an induced magnetic field within the material influences the currents in the walls of the chamber. These wall currents are diverted by the induced field away from the resistive material of the chamber walls for one direction of propagation through the structure and are directed into the resistive material for dissipation therein for the opposite direction of propagation. This diversion of the wall currents is made without in any substantial way distorting or disturbing the normal magnetic and electric field patterns in the guide itself so that wave components therein precisely match the wave components in the connected wave guide components for both directions of propagation thus maintaining a good impedance match between the isolator and the system in which it is interposed.

These and other objects, the nature of the present invention, and its various features and advantages, will appear more fully upon consideration of the specific illustrative embodiment shown in the accompanying drawings and described in detail in the following explanation of these drawings.

Figure 2A:
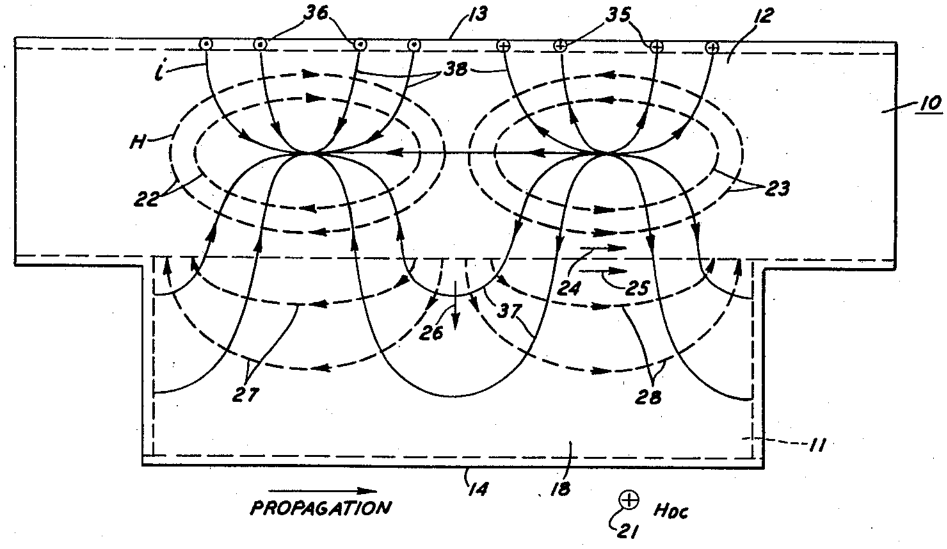
Figure 2B:
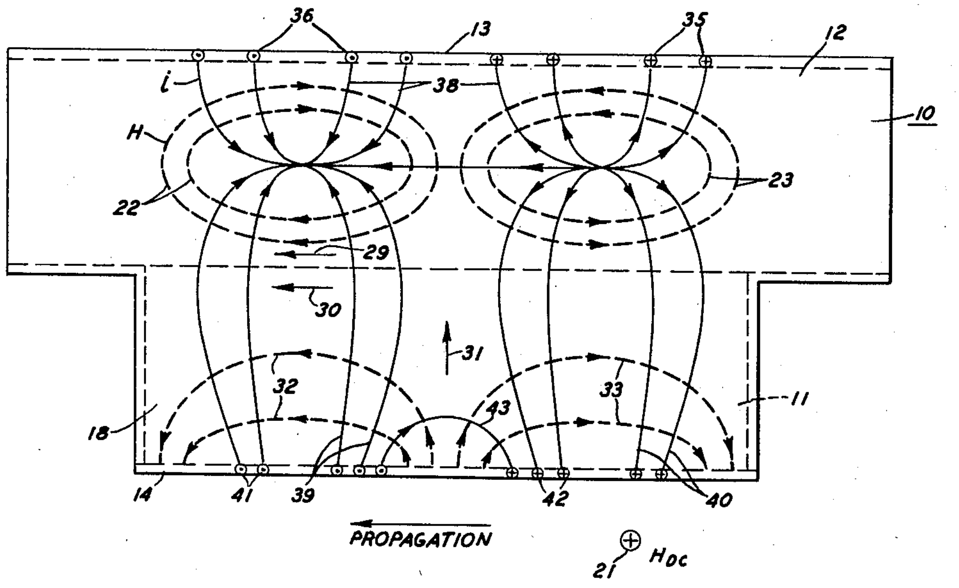
Figure 3:
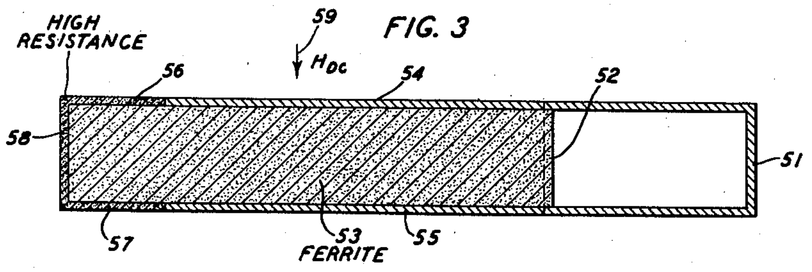

In the drawings:

Fig. 1 is a perspective view of a preferred embodiment of the invention;

Figs. 2A and 2B, given for the purpose of explanation, are representative patterns of magnetic field and wall currents in the embodiment of Fig. 1 for respectively opposite directions of wave energy propagation therein; and Fig. 3 is a cross-sectional view representing a modification of the embodiment of Fig. 1.

Referring more specifically to Fig. 1, a non-reciprocal attenuator or isolator is shown as an illustrative embodiment of the present invention. The isolator comprises a section 10 of rectangular wave guide which is to be interposed in the path requiring isolation, such as between a source and a load. Guide 10 has highly conductive wide walls 12 and 16 of internal transverse dimension of at least one half the guide wavelength of the energy to be conducted thereby and highly conductive narrow walls 13 and 15 of internal transverse dimension substantially one half the wide dimension. Guide 10 is provided with a transversely expanded portion which forms a chamber opening upon narrow wall 15 through an aperture 17. Aperture 17 extends transversely for substantially the complete width of wall 15 and longitudinally for several wavelengths along guide 10. Conductive walls 18 and 19 are provided as extensions of top and bottom walls 12 and 16 of guide 10 which, together with two end plates, such as 20, conductively enclose four sides of the chamber.

The fifth and remaining side of the chamber is covered by a wall 14 of high resistance material extending parallel to the plane of aperture 17 and spaced therefrom by at least one half wavelength. For the purpose of the present invention, the ordinarily relative term "high resistance" as applied to the material of wall 14 will be taken specifically to mean the resistance of a material having a resistivity of greater than about $15\times10^{-6}$ ohm centimeters at 20 degrees centigrade. Within this category are the commercially available resistive materials commonly used for heating elements in electrical appliances, which materials usually comprise alloys of nickel, zinc and/or iron with copper. Opposed to this group of high resistance materials are the low resistive materials commonly recognized as being good conductors of electrical energy having resistivities below $15\times10^{-6}$ ohm centimeters at 20 degrees centigrade. Resistive wall 14 is electrically connected to the lateral edges of extensions 18 and 19 and comprises the sole current conducting path therebetween, i.e., no highly conductive wall is located adjacent to resistive wall 14.

Substantially the entire space within the chamber bounded by conductive extensions 18 and 19, end plates 20, resistive wall 14 and the plane of aperture 17 is filled with an element 11 of gyromagnetic material of the type having electrical and magnetic properties of the type described by the mathematical analysis of D. Polder in Philosophical Magazine, January 1949, volume 40, pages 99 through 115. More specifically, element 11 may be made of any nonconducting ferromagnetic material. For example, it may comprise iron oxide with some of the oxides of one or more bivalent metals such as nickel, magnesium, zinc, manganese, and aluminum, combined in a spinel crystal structure. This material is known as a ferromagnetic spinel or as ferrite. Frequently these materials are first powdered and then molded with a small percentage of binder according to the process described in the publication of C. L. Hogan, "The Microwave Gyrator" in the Bell System Technical Journal, January 1952.

Element 11 is biased or magnetized by an externally applied polarizing magnetic field at right angles to the direction of propagation of wave energy in guide 10. As illustrated, this field is supplied by a solenoid structure comprising a magnetic core 9 having pole-pieces N and S bearing against walls 18 and 19, respectively. Turns of wire 8 on core 9 are so wound and connected to a source 7 of variable potential to produce a magnetizing field of this polarity. The field may be provided by a solenoid of other suitable physical design, by a permanent magnet structure, or the gyromagnetic material of element 11 may be permanently magnetized, if desired.

The strength of the magnetizing field is adjusted to the region in which the components $\mu$ and $k$ in the equations for the tensor and scalar permeabilities of the gyromagnetic material are equal. As defined in an article "Behavior and Applications of Ferrites in the Microwave Region" by A. G. Fox, S. E. Miller and M. T. Weiss in the Bell System Technical Journal, January 1955, the scalar or effective permeability equation takes the form $$\mu\ eff=\mu\pm k \qquad (1)$$

in which the sum represents the permeability of a wave having field components rotating in a counterclockwise sense seen looking along the positive direction of the direct current external field and the difference represents the permeability of a wave having field components rotating in a clockwise sense and in which $$\mu=\mu_0-\frac{\gamma M\omega_0}{\omega_0^2-\omega^2} \qquad (2)$$

$$k=\frac{\gamma M\omega}{\omega_0^2-\omega^2} \qquad (3)$$

where:

$\omega_0=-\gamma H_i$
$\mu_0$=permeability of free space
$\gamma$=ratio of magnetic moment to angular momentum for the electron
$H_i$=internal direct current field, and
M is the magnetic polarization density.

It should be noted that to define the condition of $\mu=k$ is to define the condition for which the effective permeability for one sense of circular polarization is zero and the effective permeability for the opposite sense is substantially different from zero.

Under this condition of bias, it may be shown by rigorous mathematical analysis that currents are induced in wall 12 by wave energy propagating in guide 10 in the direction from the load to the source, that these currents spread into wall extension 18, and that they are then continuous into resistive wall 14 to join with similar currents induced in wall extension 19 and wall 16. Substantial dissipation of these currents then takes place in wall 14. On the other hand, it may be shown that currents are induced in wall 12 by wave energy propagating in guide 10 in the direction from the source to the load, that these currents spread into wall extension 18, but that they are there diverted by a field induced within ferrite 11 so that they are continuous upon themselves and do not pass through resistive wall 14. For the sake of brevity, however, this mathematical analysis is omitted here and the following quantitative explanation employing a development of the field patterns shown in Figs. 2A and 2B is offered in its stead.

Referring, therefore, to Fig. 2A, representative patterns of magnetic field and wall currents are shown for wave energy propagating to the right, which direction corresponds to propagation in Fig. 1 from the source to the load. Thus, Fig. 2A represents a view looking down upon wall 12 of guide 10 at a given instant of time. The corresponding direction of the direct current magnetic field is indicated by the symbol 21. Fig. 2B is a similar representation for propagation to the left or in the direction from the load to the source in Fig. 1.

Loops 22 and 23 in both Figs. 2A and 2B represent the magnetic field pattern directly below wall 12 of guide 10 for two representative wavelengths. This pattern is substantially identical to the corresponding pattern of a dominant mode in a conventional wave guide; and since it is identical for both directions of propagation, similar loops and reference numerals appear in both Figs. 2A and 2B.

Directly below wall extension 18, the magnetic field pattern, which represents energy induced and stored within the ferrite 11, is different for opposite directions of propagation. For both directions, however, the configuration of the ferrite field is determined by three principal considerations: (1) the longitudinal field within the ferrite at the ferrite interface adjacent to the plane of aperture 17 must be consistent with the inducing longitudinal field adjacent to the ferrite but within guide 10; (2) the transverse field within the ferrite must be consistent with that flux which is induced by the precessing electrons within the ferrite; and (3) the transverse and longitudinal field components must combine to form discontinuous half loops since the effective permeability for one sense of rotation is zero.

The first consideration would appear to be self-explanatory. The second consideration can be explained by the recognition that ferrite element 11 is gyromagnetic in that it contains unpaired electron spins which tend to line up with the applied magnetic field. These spins have an associated magnetic moment which can be made to precess about the line of the biasing magnetic field, keeping an essentially constant moment component in the direction of the applied biasing field and at the same time providing a moment component which may rotate in a plane normal to the field direction. Thus, when a reciprocating high frequency magnetic field of electromagnetic wave energy is impressed upon the moment, the moment will commence to precess in a clockwise angular sense when viewed in the positive direction of the biasing field and to resist rotation in the opposite sense.

The combined effect of many such electrons and their associated moments produces in the gyromagnetic material not only a flux representing the impressed magnetic field, but also a flux representing the reciprocating field at right angles in space to the applied field. An effective field is then produced by the induced flux and may be thought of as a transverse field component at right angles to the inducing longitudinal field component. However, the precessional motion of the electron's moment brings this transverse field to its maximum value 90 degrees out of phase with the inducing longitudinal field. This precession follows the same direction about its orbit regardless of the direction of propagation of the high frequency waves. Thus, in Fig. 2A, the longitudinal field components in guide 10 represented by vector 24 induce a longitudinal component 25 in ferrite 11. Ninety degrees later in time the wave has propagated to the right one-quarter wavelength, and an induced transverse component 26 reaches its maximum in a sense which is determined by giving vector 25 a clockwise rotation.

The resulting lines of the magnetic field within ferrite 11 may now be drawn with reference to vectors 25 and 26 taking into account the third consideration above to form discontinuous half loops. Thus for the direction of propagation represented by Fig. 2A, the magnetic field within ferrite 11 assumes the configuration represented by lines 27 and 28. The existence of discontinuous loops of magnetic field may on first consideration appear to be inconsistent with Maxwell's equations which require all flux loops and, in the ordinary case, all field loops, to be continuous. The inconsistency is resolved when it is recognized that under the defined condition of direct current bias, the effective permeability for one sense of circular polarization is zero. Since flux density is equal to the product of permeability and field strength, a field may exist without an accompanying flux if the permeability associated with that flux is zero. These considerations are met only by half loops of field strength since only half loops involve a circular polarization of one sense only as the wave propagates. Since the lines spread out they also produce intensities that decrease exponentially as the depth into the ferrite is increased.

For the opposite direction of propagation as represented by Fig. 2B, a longitudinal component 29 induces a longitudinal component 30 in the ferrite. Ninety degrees later in time the wave has propagated to the left one-quarter wavelength and an induced transverse component 31 reaches its maximum in a sense which results from a clockwise rotation of vector 30. The resulting discontinuous half loops of magnetic field assume the configuration represented by lines 32 and 33 of Fig. 2B which have intensities that increase exponentially as the depth into the ferrite is increased.

Having thus established the configuration of the magnetic field within guide 10 and the induced field within ferrite 11, it is a straightforward matter to connect these fields by lines drawn normal to them at every point to represent the wall currents induced by these fields. Thus, in Fig. 2A the solid lines 37 and 38 represent the currents in wall 12 and the extension 18 thereof. It will be noted that the currents 38 are continuous into the side conductive wall 13 of guide 10 as represented by the symbol 35 indicating current flowing into the plane of the paper and symbol 36 indicating current flowing out of the paper. However, the currents 37 are in effect diverted by the induced field within ferrite 11 to be continuous upon themselves in extension 18 and to produce only negligible currents in the resistive wall 14. Therefore, for the direction of propagation represented by Fig. 2A, substantially no attenuation is presented to wave energy traversing guide 10. For the opposite direction of propagation, however, as represented by Fig. 2B, currents 39 and 40 are continuous into resistive wall 14 as represented by symbols 41 and 42. In addition, currents represented by lines 43 are generated that also pass into resistive wall 14. Therefore, substantial attenuation is introduced to wave energy for this direction of propagation.

It should be noted that the field within the ferrite represents stored energy in the ferrite and is not to be confused with the conventional magnetic field of a propagating wave. While the field influences the wall currents in the manner described, there is no electric field associated with it. Therefore, both the magnetic and electric field within guide 10 remain as they would have been had aperture 17 been closed by a conductive partition. Thus, wave energy propagating in either direction along guide 10 encounters no change of impedance or field pattern when it reaches the cross section of aperture 17. Therefore, an isolator in accordance with Fig. 1 may be inserted into a system by connecting to either end of guide 10 wave guide components having cross-sectional dimensions equal to guide 10 without introducing impedance discontinuities into the system. Since there is no electric field within ferrite 11, the ferrite introduces no dielectric loss to wave energy propagating in either direction, which feature is particularly important in maintaining a minimum loss in the direction from the source to the load.

Having thus described a preferred embodiment of the invention, several modifications and alternatives thereof may be considered. First, it should be noted that the bias condition $\mu=k$ represents an optimum adjustment whereby the largest difference of attenuation for opposite directions of propagation is obtained. However, substantial differences of attenuation are still exhibited for biasing strengths considerably removed from the precise optimum value. Departure from the optimum value has the effect of diluting the field patterns shown in Figs. 2A and 2B by allowing increasingly larger numbers of complete loops of field to form in the ferrite for both directions of propagation.

Further, the dimensions of the cavity containing the ferrite and the dimensions of member 11 therein are subject to variation. As illustrated in Fig. 1, a preferred proportion appears to involve a longitudinal extension along the length of guide 10 of several guide wavelengths, more specifically in the order of four, with a transverse dimension in the order between half and one guide wavelength. However, by increasing the transverse dimension, the longitudinal extension may be decreased. This is illustrated in the embodiment now to be described with reference to Fig. 3 in which provision is also made for the addition of more resistive material.

Referring therefore to Fig. 3, a cross-sectional view is shown of an embodiment illustrating alternative proportions of the invention. The conductively bounded guide portion 51 has a wide dimension of between one half wavelength and one wavelength and therefore corresponds to guide 10 of Fig. 1. Guide 51 opens through aperture 52 upon ferrite element 53 that extends longitudinally along guide 51 for a distance that may be less than one half wavelength but has a transverse dimension measured parallel to the wide dimension of guide 51 that is more than one guide wavelength. Conductive extensions 54 and 55 of the wide walls of guide 51 extend transversely for a distance of one guide wavelength. The remainder of the transverse extent of element 53 is bounded on top and bottom by highly resistive walls 56 and 57 that are connected along one lateral edge to conductive extensions 54 and 55, and are connected along the other lateral edge to high resistance wall 58. The external direct current magnetizing field is represented schematically by vector 59.

Operation of the embodiment of Fig. 3 is substantially similar to that of Fig. 1 except that resistive walls 56 and 57, as well as resistive walls 58, extend in regions of high wall currents for the direction of propagation from load to the source, since for this direction the density of the current increases exponentially as the distance away from guide 51 is increased. For the opposite direction of propagation the density of the wall currents has decreased to a small value at the position of walls 56 and 57 so that these walls introduce substantially no attenuation.

In all cases, it is understood that the above-described arrangements are simply illustrative of the many possible specific embodiments which can represent applications of the invention. Numerous and varied other arrangements can be devised in accordance with the disclosed principles by those skilled in the art without departing from the spirit and scope of the invention.

What is claimed is:

1. A nonreciprocal attenuator for electromagnetic wave energy comprising a section of conductively bounded wave guide for said wave energy, an enclosure forming a cavity coupled on one side thereof with said guide, an element of gyromagnetic material substantially filling said enclosure, and means for magnetizing said material to the region in which the components $\mu$ and $k$ of its tensor permeability are substantially equal so that differently configured magnetic fields are induced in said material by wave energy propagating in said guide in respectively opposite directions, portions of said cavity enclosure that are remote from said one side and that have unequal wall currents induced therein by said fields within said material being made of electrically dissipative material whereby unequal dissipation of said currents takes place in said dissipative material for said opposite directions.

2. A nonreciprocal attenuator for electromagnetic wave energy centered about a given operating frequency comprising a wave guiding structure of rectangular cross section having a portion of the boundary thereof of electrically conductive material and the remainder of the boundary thereof of electrically dissipative material, a member of gyromagnetic material having tensor permeability components $\mu$ and $k$, said member extending within said structure contiguous to and coextensive with said boundary of dissipative material for at least several wavelengths at said operating frequency in the direction of propagation of said energy, and means for applying a magnetic field to said member of strength making $\mu$ substantially equal to $k$.

3. An electromagnetic wave component comprising a section of conductively bounded wave guide of rectangular transverse cross section, a portion of a narrow wall of said guide being removed to form an aperture, an enclosure forming a cavity opening into said guide through said aperture, a portion of the walls of said enclosure being formed of highly resistive material for dissipating wall currents carried by said material, the remainder of the walls of said enclosure being formed of highly conductive material, an element of gyromagnetic material substantially filling said enclosure, and means for magnetizing said material in a polarization perpendicular to the direction of propagation of wave energy along said guide.

4. An electromagnetic wave energy component comprising a section of conductively bounded wave guide for said wave energy, said section having a transversely expanded portion forming a cavity opening upon a side thereof, a portion of the boundary walls of said cavity which carries wall currents associated therewith being formed of electrically dissipative material, and a member of polarized gyromagnetic material substantially filling said cavity.

5. An electromagnetic wave energy component comprising a wave guiding structure for said energy having a rectangular transverse cross section, said energy being within a specified range of operating frequencies, said structure having at least one electrically dissipative wall current carrying boundary wall thereof comprising highly resistive material extending parallel to the direction of propagation of said energy and the remainder of the boundary thereof comprising highly conductive material, and an element of polarized gyromagnetic material located contiguous to said resistive material and partially filling said structure.

6. A component according to claim 5 wherein said resistive material comprises a narrow wall of said structure.

7. A component according to claim 5 wherein said resistive material comprises a narrow wall and a portion connecting with said narrow wall of at least one wider wall of said structure.

8. A component according to claim 5 including a pair of sections of conductively bounded rectangular wave guide at opposite ends of said structure coupling into said structure to one side of said gyromagnetic material.

9. A component according to claim 5 wherein said gyromagnetic material is biased by a magnetizing field to the strength making the effective permeability of said material substantially zero for one sense of circularly polarized R.F. magnetic field rotating at a frequency within the said operating range.

10. A component according to claim 5 wherein the widest transverse dimension of said rectangular cross section of said structure is at least one and one half guide wavelengths of said energy and wherein said gyromagnetic material fills more than one half of said structure viewed in said transverse cross section.

11. An electromagnetic wave energy component comprising a wave guiding structure for said energy, said structure having boundary walls for carrying the wall currents associated with said energy, a portion of said boundary walls being highly conductive to carry said wall currents with a minimum of dissipation and the remaining portion of said boundary walls being highly resistive for dissipating wall currents continuing from said conductive portion into said resistive portion, an element of gyromagnetic material located contiguous to said resistive material and partially filling said structure, and means for magnetizing said gyromagnetic material.

References Cited in the file of this patent

UNITED STATES PATENTS

| | | |
|---|---|---|
| 2,511,610 | Wheeler | June 13, 1950 |
| 2,611,094 | Rex | Sept. 16, 1952 |
| 2,639,327 | Heller | May 19, 1953 |
| 2,645,758 | Van de Lindt | July 14, 1953 |
| 2,745,069 | Hewitt | May 8, 1956 |
| 2,784,378 | Yager | Mar. 5, 1957 |
| 2,798,205 | Hogan | July 2, 1957 |